March 26, 1929.    A. J. HUGHES    1,707,122
LIQUID HEATING ATTACHMENT
Filed July 25, 1927    2 Sheets-Sheet 2
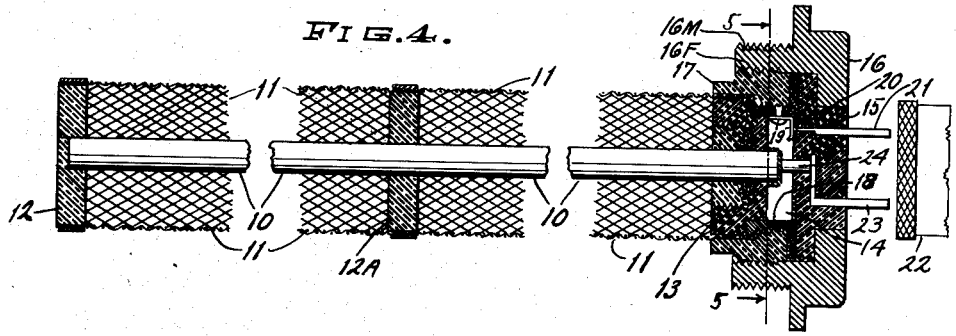
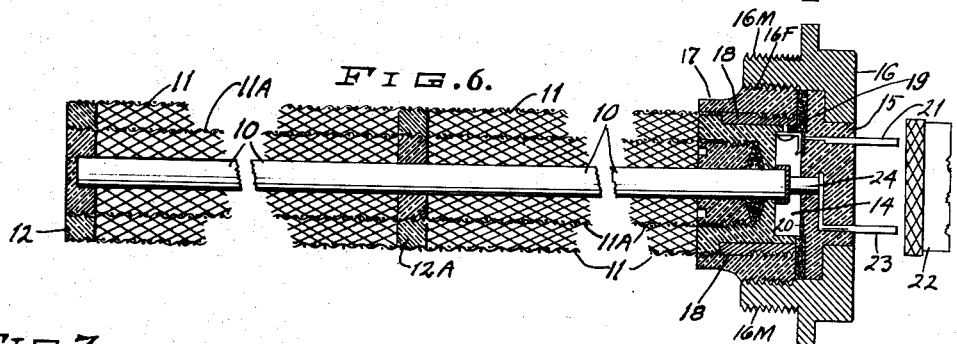
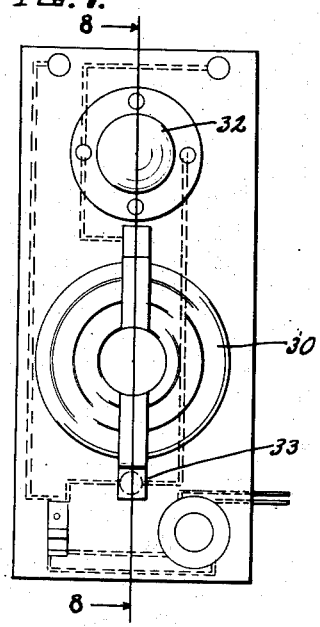
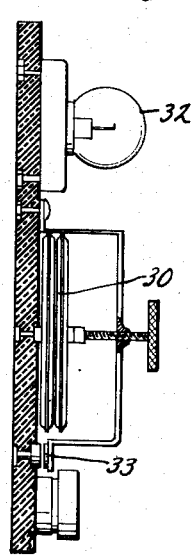
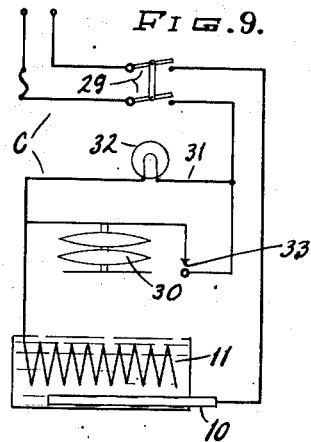
INVENTOR:
Albert J. Hughes
By David E. Carlsen
ATTORNEY.

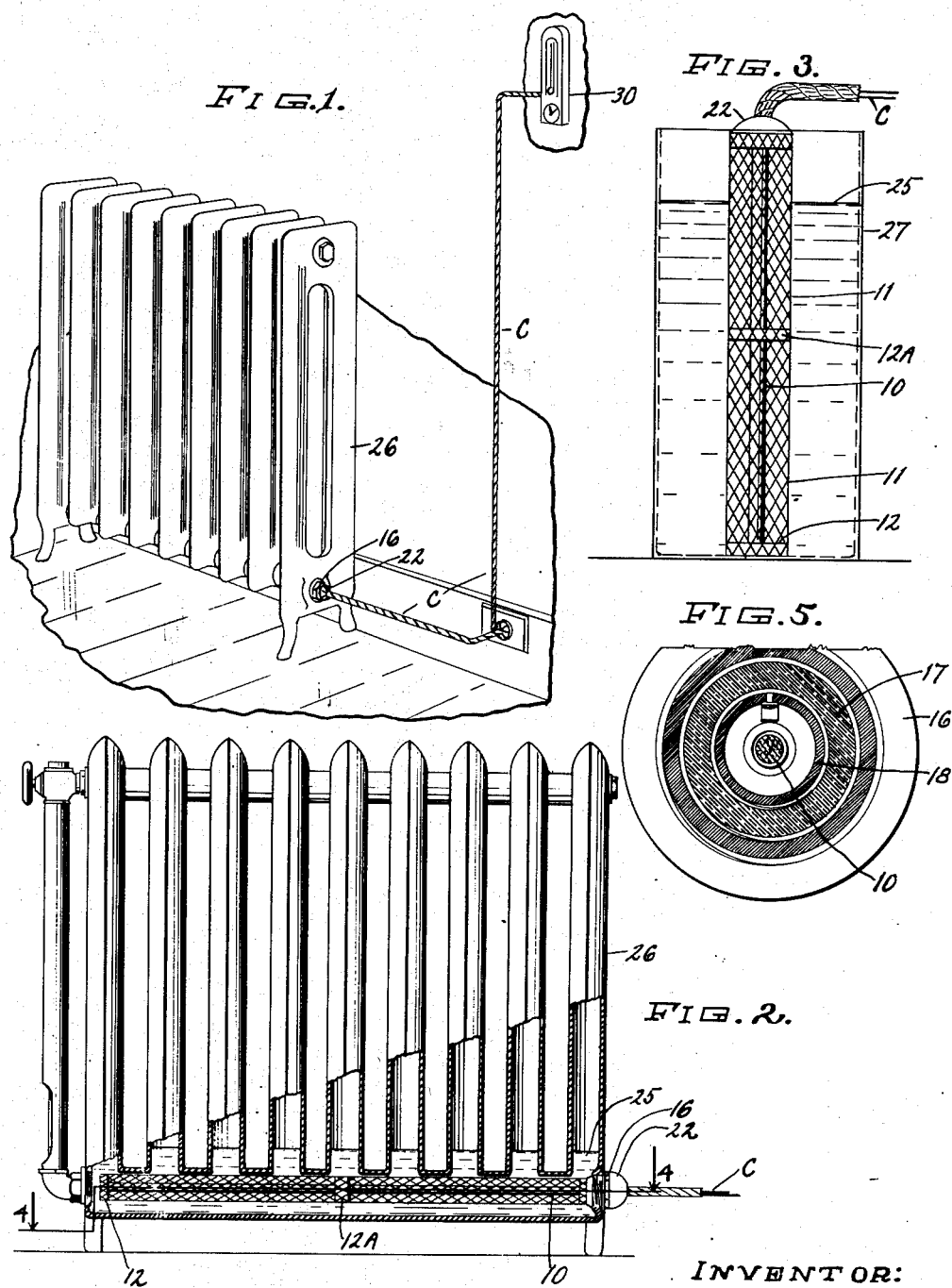

Patented Mar. 26, 1929.

1,707,122

UNITED STATES PATENT OFFICE.

ALBERT J. HUGHES, OF ST. PAUL, MINNESOTA.

LIQUID-HEATING ATTACHMENT.

Application filed July 25, 1927. Serial No. 208,328.

This invention relates to an electric liquid heating device designed particularly for use in liquid containers of various kinds among which are house and motor vehicle radiators, steam boilers, hot water heating plants, stock-watering tanks and receptacles of various kinds in which water or other liquids are to be heated or steam generated. The device includes one or more tubes of wire mesh inclosing a main electrode immersed in water or other liquid so that said liquid provides a conducting medium between the electrode and tube and is heated by the current.

One object of the invention is to provide automatic means for controlling the flow of current to the heating medium. Other objects and features of my improved heater will be fully set forth in the following specification and claim, reference being had to the accompanying drawings, in which,—

Fig. 1 is a perspective view of a steam radiator embodying my improvements.

Fig. 2 is a partly sectional side elevation of the radiator shown in Fig. 1 and revealing my device more clearly in operative position.

Fig. 3 is an elevation of my heating device as applied to an upright vessel containing water to be heated.

Fig. 4 is an enlarged section of the heating device as on line 4—4 in Fig. 2 and Fig. 5 is a transverse sectional detail of the socket part of my device as on line 5—5 in Fig. 4.

Fig. 6 is a modification of Fig. 4.

Fig. 7 is a front view of the thermostatic means and Fig 8 is a section on line 8—8 in Fig. 7.

Fig. 9 is a schematic circuit diagram.

Referring to the drawing by reference numerals, the heating element comprises a main electrode 10 held concentrically within a tube 11 formed of wire screen or the like, the means for holding the electrode central comprising preferably an end disc 12 and any suitable number of inner discs 12$^A$, of non-conductive material and bored to retain member 10 passed through the discs 12$^A$, the front end of said member 10 simply being retained in a central pocket at the inner side of disc 12 (see Figs 4 and 6).

In Fig. 6 11$^A$ is an auxiliary inner tube also concentric about electrode 10 and suitably retained in this position also in the discs 12 and 12$^A$.

13 is a collar arranged to hold the rear end of electrode 10 which projects into an aperture 14 formed between said collar and a flanged non-conductive bushing 15 fitted into the central part of a large flanged cap 16 having forwardly extending male threads 16$^M$ and female thread 16$^F$. 17 is an intermediate sleeve threaded to engage threads 16$^F$ and the front bore of which concentrically retains the rear end of tube 11 between it and the outside of collar 13. 18 is a threaded metal collar fitted into the reduced rear part of sleeve 17, electric current being conducted from the tube 11 through said collar 18 to a contact 19 which in turn conveys current through a metal washer 20 in flanged bushing 15 having a partially imbedded terminal 21 connected to said washer 20 and extending outwardly thereof to and engageable together with another terminal 23 in a plug 22. Said terminal 23 has a contact connection 24 conveying current to the electrode 10 (see Figs. 4 and 6).

In Fig. 6 I have shown an auxiliary inner tube 11$^A$, as previously mentioned. In either the single or multiple tube types of my device all or any part of the tubular member is submerged, not including the head cap 16, as in Fig. 2, in the water 25 in the lower part of a radiator 26 or in any vessel as 27 in Fig. 3.

In Fig. 2 is shown that cap 16 is threaded into the intake aperture 26$^A$ of a steam or hot-water radiator so that the tube 11 extends into to the bottom part of the radiator and is submerged in a quantity of water therein. Then when the circuit is closed current will pass from the electrode through water into tube 11 or tubes 11 and 11$^A$ as the case may be and thus heat the water and generate steam. As applied in Fig. 3 a volume of water in a receptacle may be heated very rapidly and if the water should all vaporize current will of course be shut off as there is then no water acting as a conductor, but it is further obvious that the device is in use as a water heater as long as there is water in the receptacle unless the current is otherwise shut off.

I provide automatic means for controlling the current to the heating element, such means including if so desired a switch 29 in the circuit C of the element controlled by a thermostat 30, so that when the room or other compartment in which the radiator 26, for example, is heated to a certain degree, the thermostat will open the cut-out 33 and thus break circuit to the heating element. As soon as the room cools enough to contract the thermostat, the cutout 33 will close again so that current will pass to the heating element. I may also bridge the thermostatic device by means of a by-pass conductor 31 in which is a lamp 32. In this case when the cut-out 33 is closed, current will pass to the heating element without passing through the lamp, owing to the resistance offered by the lamp, and when the cut-out is open current flows through and lights the lamp.

As will be seen, with this invention, single radiators may be used to heat a house or other building and it will not be necessary to have a central heating plant. The thermostatic device will act accurately to hold the temperature of a room at a certain degree.

It will further be readily understood that my device, when used as a portable article may be used for other heating purposes, such as heating a kettle of water, substituting fire flues in a boiler with a number of my devices, and other uses not necessary to be enumerated.

I claim:

In an electric liquid heater adapted to be inserted in a volume of liquid and detachably connected with a source of electric current and said heater comprising an elongated central electrode, a number of tubes of perforated metal surrounding said electrode concentrically and means for insulating the said perforated members from the elctrode and means connecting one end of the said electrode and the adjacent ends of said tubes in fixed relative positions; said latter means a cap and an insulated cap bushing, a central non-conductive electrode retaining bushing, a secondary non-conductive bushing threaded in said cap and retaining said central bushing within it, conductor terminals fixed in said cap bushing, and contact means within said cap and the said central bushing for conducting current through one terminal to said electrode and for passing current from said tubes to the other of said terminals.

In testimony whereof I affix my signature.

ALBERT J. HUGHES.